United States Patent [19]

Movick

[11] 4,116,379

[45] Sep. 26, 1978

[54] HEATING APPARATUS

[76] Inventor: Nyle Orland Movick, 4600 Macky Way, Boulder, Colo. 80302

[21] Appl. No.: 812,045

[22] Filed: Jul. 1, 1977

[51] Int. Cl.² ............................ F24J 3/02; F24D 3/00
[52] U.S. Cl. .................................. 237/1 A; 126/400; 126/132; 165/1; 237/59
[58] Field of Search ............... 237/1 A, 59; 126/400, 126/132, 133; 165/1

[56] References Cited

U.S. PATENT DOCUMENTS

| | | | |
|---|---|---|---|
| 2,680,565 | 6/1954 | Lof | 237/1 A |
| 3,919,998 | 11/1975 | Parker | 237/1 A |
| 3,931,806 | 1/1976 | Hayes | 126/400 |
| 3,951,204 | 4/1976 | Movick | 165/1 |
| 3,958,755 | 5/1976 | Cleer | 237/1 A |
| 4,034,912 | 7/1977 | Hayes | 237/1 A |
| 4,049,194 | 9/1977 | Tice et al. | 237/1 A |
| 4,050,626 | 9/1977 | Awalt, Jr. | 237/1 A |
| 4,052,000 | 10/1977 | Honikman | 237/1 A |

*Primary Examiner*—Henry C. Yuen
*Attorney, Agent, or Firm*—Stephen A. Gratton

[57] ABSTRACT

A domestic heating system that utilizes heat collectors such as solar collectors or fireplace heat collectors, and effectively transfers the heat from these collectors for storage or useage without additional energy input. Thermal pump apparatus is utlized for transferring the collected heat to a lower level of the building where the heat can be more easily distributed or stored. A heat exchanger is utilized to extract heat from the thermal pump apparatus at the lower level and transfer the heat to the supply piping or ducting of a conventional forced air or hot water heating system. A heat storage tank can be included in the system for storing the collected heat that cannot be used immediately.

10 Claims, 3 Drawing Figures

HEATING APPARATUS

BACKGROUND OF THE INVENTION

1. Field of Invention

The present invention relates to heating apparatus and more particularly to domestic heating apparatus utilizing apparatus for thermally circulating a liquid as disclosed in my prior U.S. Pat. No. 3,951,204.

2. Description of Prior Art

Due to rising energy costs various types of heating apparatus have been proposed to supplement or to replace conventional domestic heating systems and apparatus. Systems utilizing solar heat collectors and fireplace heat collectors, for example, are commercially available to supplement or replace conventional gas or electric heating systems. A major disadvantage of such apparatus is that in order to effectively transfer heat from the collection point to a storage point or to the area to be heated, considerable energy must be expended in transporting heat from an elevated position to a lower position where the heat is used or can be more easily distributed. The well known thermal syphon effect will operated to transfer heat from a lower position to a more elevated position, but since the reverse does not generally occur, mechanical apparatus such as pumps or blowers are generally utilized for transferring heat from a higher to a lower position. Solar collectors for instance, are usually roof mounted and pumps and blowers are conventionally utilized to transfer the collected heat from the roof level to a lower level where it is used or stored. Fireplace heat collectors must also utilize pumps or blowers for moving a heat transfer fluid to other areas in the building.

The use of pumps and blowers in systems of this type not only expends considerable energy but also requires expensive equipment and controls. Another disadvantage of such prior art systems is that additional controls are often required to prevent thermal flow from lower level heat sources such as boilers or furnaces, or heat storage tanks, to the upper level collectors which act as heat sinks when not in use. For example, in solar heating systems that utilize heat storage tanks or supplemental furnaces, if the collectors are roof mounted and are not separated from the lower level heat storage tanks or supplemental furnaces by valves or other means, during the night, energy can be lost through thermal flow to the collectors. Many collector systems ignore this "reverse energy flow" problem entirely and consequently considerable energy is wasted.

SUMMARY OF INVENTION

The present invention overcomes these disadvantages, and provides a heating system that utilizes heat collectors, such as solar collectors or fireplace collectors, and effectively transfers the heat from these collectors, for use or storage, without additional energy input. In addition, the collectors may be utilized in combination with conventional hot water or forced air domestic heating apparatus, with minimum additional material and controls, and no additional valves or controls are needed to prevent a "reverse energy flow".

The heating system of the invention generally comprises: collector means for collecting heat from a source of heat and transferring the heat to a working fluid; thermal pump means for circulating the working fluid from the collector means to a lower location, whereby heat is pumped from the collector means to the lower location where it can be more easily stored or distributed for use; and heat exchanger means for extracting heat from the working fluid at the lower location and distributing the heat to building. Additionally, heat storage means can be added to the system for storing the collected heat that cannot be immediately used.

DETAILED DESCRIPTION OF THE INVENTION

Figure 1:
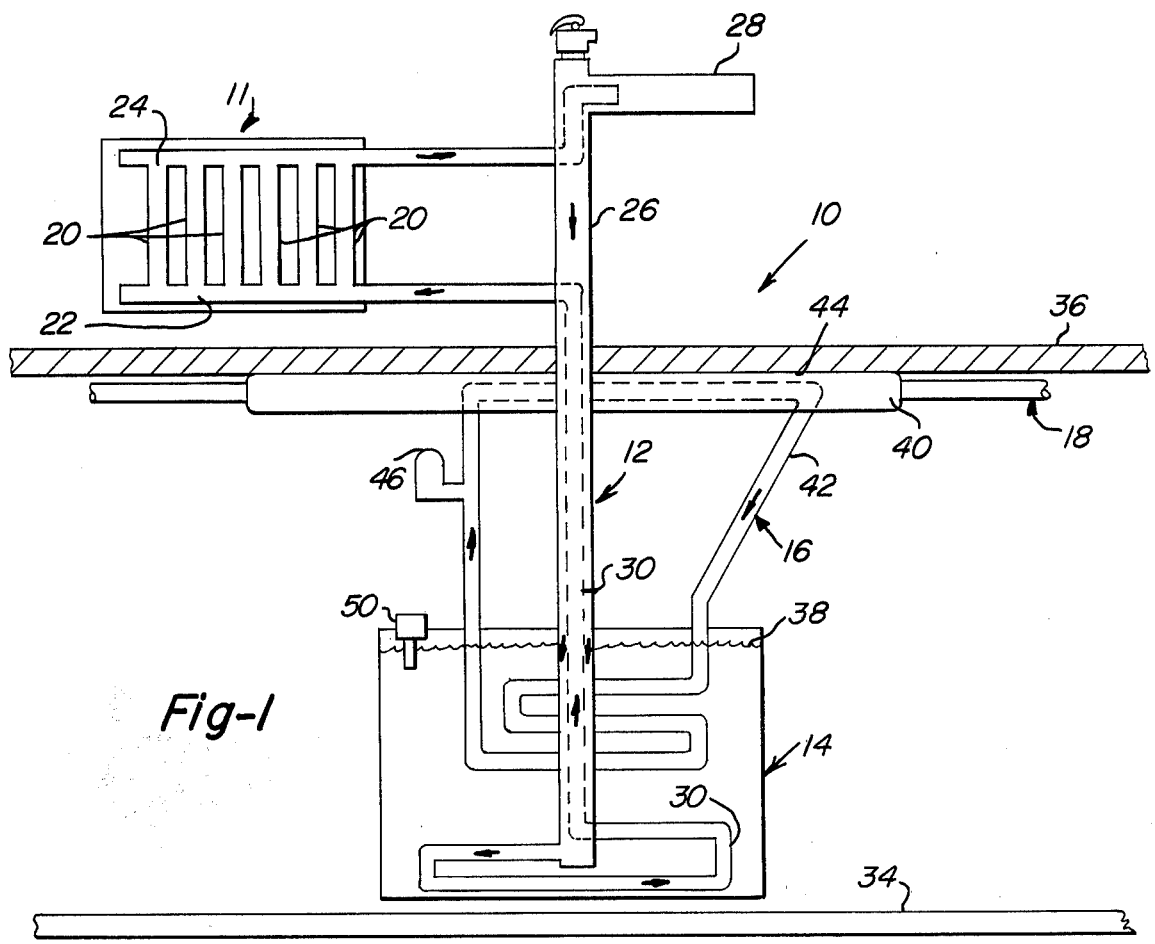
FIG. 1 is a diagrammatic side elevation view of the heating system of the invention.

The new and improved heating system 10 is shown in FIG. 1 in combination with a conventional domestic heating system, and generally comprises: collector means, in the form of a fireplace heat collector 11 for collecting heat for input into the system; thermal pump means in the form of thermal pump apparatus 12 for transferring the input heat to a lower level; heat storage means, in the form of a liquid storage tank 14, for storing collected heat; and heat exchanger means in the form of a dual pipe heat exchanger 16 for transferring heat from the storage tank 14 to the outlets of the conventional domestic heating system 18.

Heat Collector

The fireplace collector 11 is a grid type device designed to fit in the hearth of a conventional fireplace. The collector 11 comprises a plurality of radially curved spaced parallel pipes 20, connected to a lower level manifold pipe 22 and an upper level manifold pipe 24, forming a c-shaped fireplace grid for partially surrounding the burning logs. Heat is collected from the burning logs and transferred through the grid to a working fluid which is thermally circulated from the lower level manifold 22 through pipes 20 and out of the upper level manifold 24 into the thermal pump apparatus 12.

The heat collector 11 is illustrated as a fireplace grid type collector but alternately any other type of a collector suitable for collecting heat from a source and boiling a working fluid, such as for example, solar collector panels or conventional boilers may also be used. In addition, several collectors may be mounted in series or combinations of different collectors may be separately connected, to additional thermal pump apparatus 12.

Thermal Pump Apparatus

Thermal pump apparatus 12 provides means for thermally pumping heat from an elevated position to a lower position and is apparatus of the type disclosed in my prior U.S. Pat. No. 3,951,204.

Figure 2:
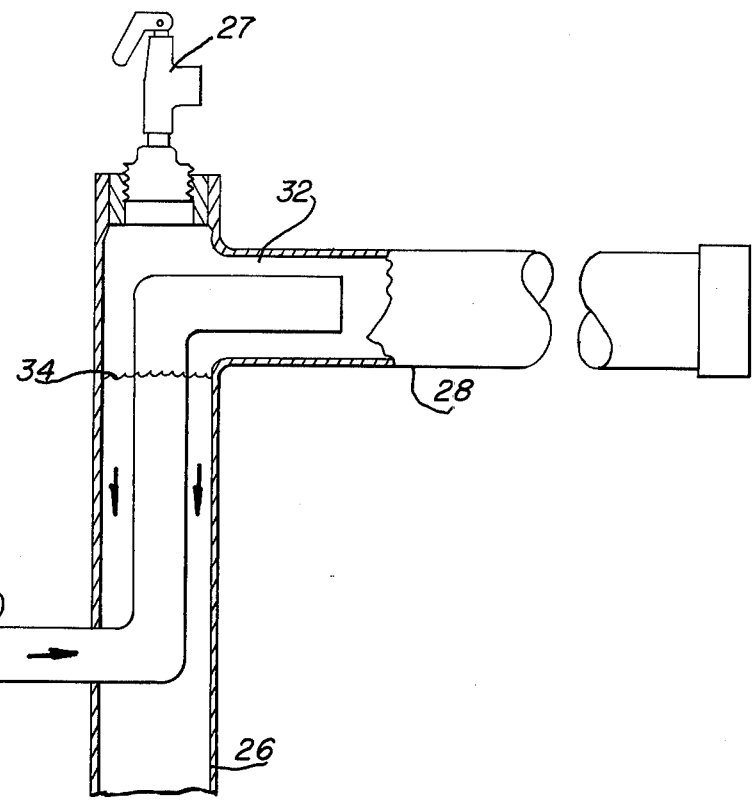
FIG. 2 is an enlarged elevation view partly in cross section showing details of the invention.
Figure 2:
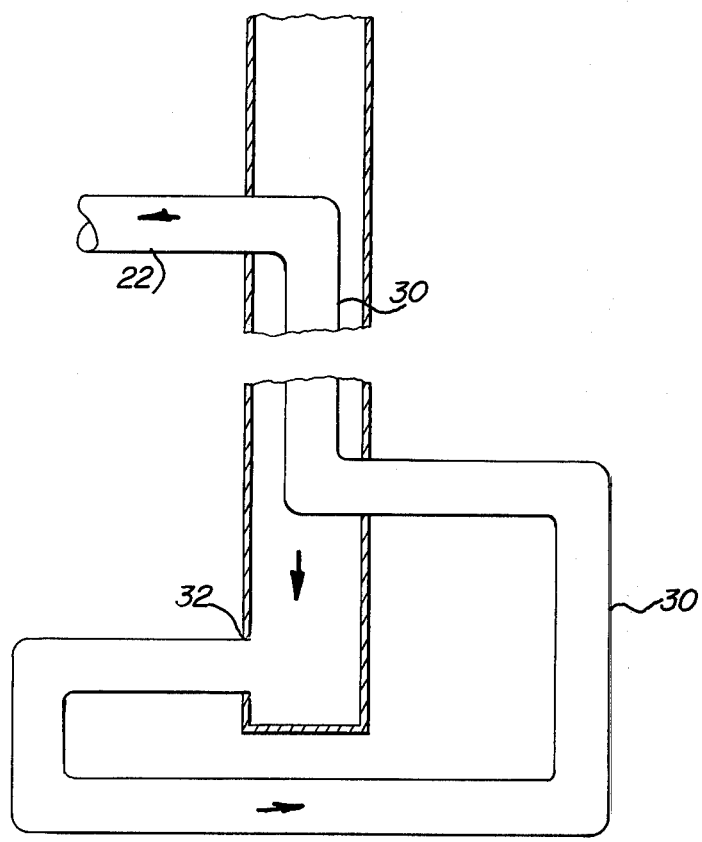

As shown in FIG. 2 the thermal pump apparatus 12 generally comprises a first standpipe 26, having a relief valve 27 mounted at the top, an expansion chamber 28 in communication with standpipe 26, and a second standpipe 30 routed through and out of the first standpipe 26 and terminating at opening 32 in communication with the first standpipe 26.

The upper manifold pipe 24, of heat collector 11, is routed into the first standpipe 26 and terminates at the expansion chamber 28, in communication with the interior 32 of the expansion chamber 28. The lower manifold pipe 22, of heat collector 11, is connected to the second standpipe 30.

The heat collector 11 and thermal pump 12 comprise a closed system for circulating a working fluid such as water as will hereinafter be described. Line 34 indicates the cold liquid fill level for the working fluid.

Heat Storage Tank

The heat storage tank 14 is located below the heat collector 11. In most buildings the heat storage tank 14 may be conveniently located in the basement 34 and the fireplace collector 11 or solar collectors (not shown) located at the ground floor 36 or roof levels (not shown). The storage tank 14 is filled with a heat storage liquid such as water 38 for accumulating the heat collected by collector 11. The tank 14 may be insulated and of a sufficient volume to store a useable quantity of heat.

Standpipe 30 of thermal pump 12, is routed along the bottom of the storage tank 14 and is submerged in the storage liquid 38. In addition a portion of standpipe 26 is submerged in the storage liquid. This arrangement is such that if standpipe 26 and 30 are at a higher temperature than the storage liquid 38, heat will flow from the standpipes to the storage liquid.

Heat Exchanger

The dual pipe heat exchanger 16 enables heat to be transferred from the storage tank 14 to the outlets of the domestic heating system 18 for distribution to the building. The heat exchanger 16 generally comprises a first large diameter supply pipe 40 connected to and in communication with the supply piping or ducting of a conventional hot water or forced air domestic heating system 18, and a second smaller diameter closed pipe loop 42 routed through the top portion of the storage tank 14 and into the larger diameter supply pipe 40. The hot water or air of the conventional heating system 18 flows in the annular space 44 formed by the two pipes 40 and 42.

Pipe 42 is filled with a heat exchanger fluid, such as water, which may thermally circulate within the closed pipe loop, picking up heat from storage tank 14 and transferring it to the hot water or air of the conventional heating system 18 flowing in annular area 44. A conventional expansion tank 46 may be connected to pipe loop 42 to provide for volumetric expansion of the liquid in the pipe loop 42.

Operation

To begin the cycle of operation, a fire is first started in the fireplace collector 11. Heat from the burning logs causes the working fluid in pipes 20 to boil and the resulting hot liquid and vapor flows upwardly into upper manifold pipe 24 and into expansion chamber 28. Since expansion chamber 28 is in communication with standpipe 26, the liquid expelled into the chamber 28 along with the vapor condensed in the chamber collects at the top portion of standpipe 26. Consequently, the relative liquid levels between the liquids in standpipe 26 and standpipe 30 differ with the level in standpipe 26 being higher. This difference in liquid level induces a flow down standpipe 26 and up standpipe 30 through manifold 22 and back through the fireplace collector 11, as indicated by the arrows.

My prior cited patent fully describes the heat flow in thermal pump apparatus of this nature.

The working fluid flowing in the standpipe 26 and 30 and the surfaces of the standpipes are at a temperature close to the boiling point of the working fluid which for water will be around 212° F. The temperature of the storage liquid 38, on the other hand, will be closer to room temperature which is around 75° F. This temperature difference causes heat to flow by conduction from the liquid in standpipes 26 and 30 and also from the standpipes, into the storage liquid 38.

As the logs continue to burn, the temperature of storage liquid 38 rises, along with the temperature of the heat exchange fluid in pipe loop 42. Consequently, a thermal flow is induced in pipe loop 42 with the hotter liquid within the pipe loop rising from the storage tank level to the level of supply pipe 40 where the heat is transferred by conduction and convection to the hot water or hot air of the conventional heating system 18 which is flowing in annular area 44 and which will generally be at a lower temperature level than the storage liquid 38 and thus the liquid in the pipe loop 42.

This thermal flow will be induced in pipe loop 42 whenever the temperature of the storage liquid in storage tank 14 is greater than the temperature of the hot air or water of the domestic heating system flowing in supply pipe 40. If the temperature of the storage liquid 38 is high enough, the boiler or furnace of the domestic heating can be shut off completely and the building heated solely with the energy stored in storage tank 18. A storage liquid temperature of approximately 160° F will usually be sufficiently high. A temperature switch 50, may be added to the tank 14 to detect the temperature of the storage liquid 38 and deactivate heat input from the collector means or if desired, completely deactivate the boiler or furnace of the domestic heating system whenever the storage liquid temperature is sufficiently high to heat the building.

No valves or controls are required to isolate the system 10 from the domestic heating system 18 when not in use, because there can be no "reverse energy flow" from the domestic system to the storage liquid 38. Even if the temperature of the storage liquid 38 is much lower than the hot air or water of the domestic heating system flowing in supply pipe 40, the heat will not flow from the higher level of supply pipe 40 to the lower level of storage tank 14.

Figure 3:
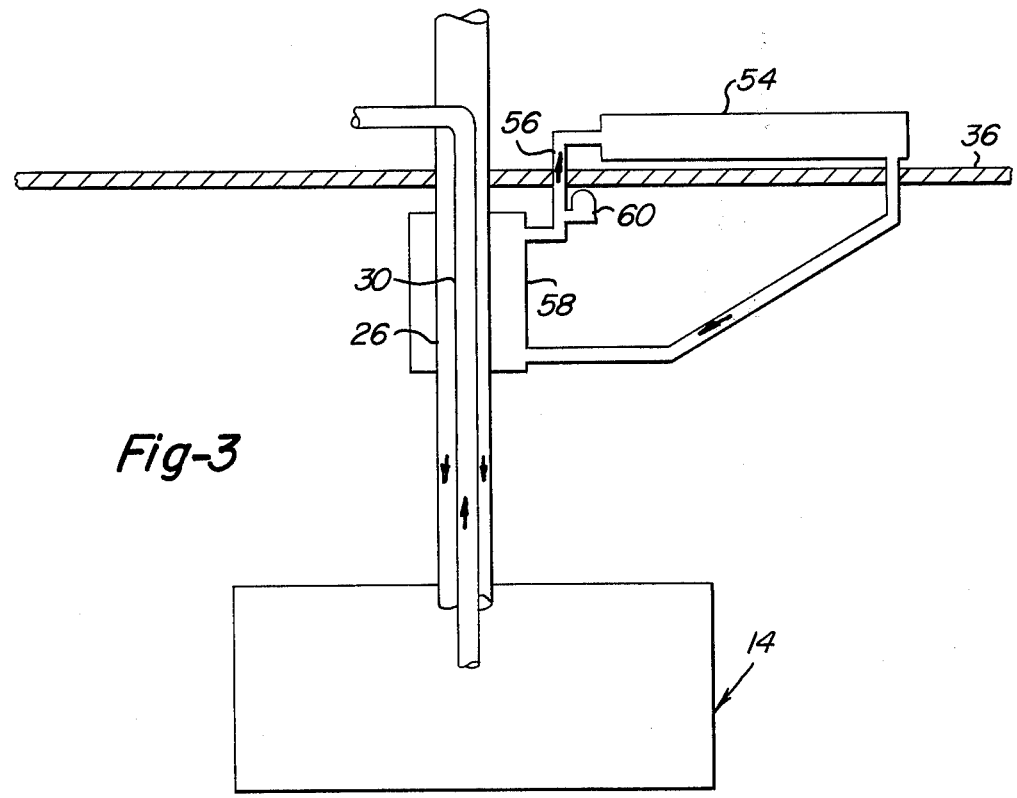
FIG. 3 is a diagrammatic side elevation view of a "quick response" system utilizing the invention.

If collector 11 is used frequently, the storage liquid in storage tank 14 will remain well above room temperature for long periods and the temperature of the storage liquid can be quickly raised to a temperature that is sufficiently high to heat the building. If however, the collectors 11 are not used for several days, the temperature of the storage liquid may drop to the point where several hours are required to heat the storage liquid to a useable temperature. To offset this time delay, "quick response" apparatus may be added to the system as illustrated in FIG. 3.

The "quick response" apparatus comprises radiator means in the form of a conventional hot water baseboard radiator 54, and a pipe loop 56 connected to a second heat exchanger in the form of a length of pipe 58 enclosing a portion of standpipe 26. The pipe loop 56 and heat exchange pipe 58 form a closed system for thermally circulating a heat exchange fluid such as water which works as follows: Shortly after a fire is started in collector 11, the temperature of standpipes 26 and 30 rises and heats the water in heat exchange pipe 58. Thia causes the water in pipe loop 56 to circulate with hot water flowing up to baseboard radiator 54, where the heat is radiated to the room, and the cold water to recirculate back to heat exchange pipe 58 as indicated by the arrows. A conventional expansion tank 60 may be included in pipe loop 58. Thus the "quick response" apparatus provides means for heating the building without the need for a heat storage liquid and storage tank or if a storage tank is utilized as illustrated, there is no need to wait for all of the storage liquid 38 to come up to a high temperature.

Although the present invention has been described in terms of a particular embodiment, providing a supplemental domestic heating system, the system could also be used as a primary heating system and it is anticipated that various changes, adaptations, and modifications will be apparent to those skilled in the art, and that it is intended that the appended claim be construed to cover such changes, adaptations, and modifications except as limited by the prior art.

What is claimed is:

1. In a heating system for a building including fuel fired heating apparatus for heating a medium such as air or water and means for circulating the medium from a supply conduit to parts of the building for heating the building, supplemental heating apparatus comprising:
    a working fluid;
    collector means adapted to contain the working fluid for collecting heat from a source for heating the working fluid;
    an expansion chamber in communication with the collector means for receiving heated liquid and vaporized working fluid from the collector means;
    a first standpipe adapted to contain the working fluid with its upper end at an elevated location and its lower end at a lower location and in communication with the expansion chamber near its upper end;
    a second standpipe adapted to contain the working fluid and in thermal conductive relationship with the first standpipe and in communication at one end with the collector means and at the opposite end with the first standpipe near the first standpipes lower end, whereby the working fluid may circulate in a closed circuit from the collector means into the expansion chamber down the first standpipe up the second standpipe and back through the collector means;
    a heat storage tank located a level below at least a portion of the supply conduit of the heating system for containing a heat storage liquid for submerging at least one of the standpipes for extracting and storing heat from the heated working fluid;
    a heat exchanger comprising a closed conduit loop routed through the storage liquid and the supply conduit and adapted to contain a heat transfer fluid and thermally circulate the heat transfer fluid from the heat storage liquid to the supply conduit for picking up heat from the heat storage liquid and for transferring the heat to the medium circulating in the heating system whereby heat may be extracted from the storage liquid whenever the temperature of the storage liquid is above the temperature of the medium circulating in the supply conduit,
    a second heat exchanger comprising a second closed conduit loop for thermally circulating a second heat transfer fluid around the outside of the first or second standpipe; and
    a heat radiator coupled to the second closed loop at a level above the lower end of the standpipes for radiating heat from the second heat transfer fluid to the building whereby the second heat transfer fluid may thermally circulate through the second closed loop picking up heat from the standpipes and transferring the heat through the radiator to the building.

2. Heating apparatus as defined in claim 1 and further comprising a temperature switch for detecting the temperature of the storage liquid and for deactivating the fuel fired heating apparatus of the heating system when the temperature reaches a certain level.

3. Heating apparatus as defined in claim 1 and wherein the collector means comprises a fireplace grid mounted in the hearth of a fireplace and adapted to contain the working fluid and transfer heat from burning logs in the fireplace to the working fluid.

4. Heating apparatus for use in combination with a hot water heating system having a boiler, radiators and a supply pipe for providing hot water from the boiler to the radiators, said heating system comprising;
    a working fluid;
    first and second standpipes adapted to contain the working fluid and extending from an elevated location to a lower location, the two standpipes connected for flow therebetween near their lower ends thereof and in thermal conductive relationship at least over a substantial portion thereof;
    collector means for collecting heat from a source and for heating the working fluid in one of the standpipes near the elevated location;
    an expansion chamber for collecting heating working fluid expelled from the standpipe to which heat is added and for conveying the collected working fluid to the other standpipes whereby the heated working fluid may circulate through the standpipes;
    a heat storage tank located at a level below at least a portion of the supply pipe for containing a heat storage liquid with a portion of at least one of the standpipes submerged in the heat storage liquid at its lower end whereby heat may be extracted from the working fluid into the storage liquid; and
    a closed pipe loop adapted to contain a heat transfer fluid and routed through the heat storage liquid and through the supply pipe of the hot water heating system whereby the heat transfer fluid may thermally circulate from the heat storage liquid to the supply pipe and back again and transfer heat from the storage liquid to the hot water in the supply pipe whenever the temperature of the storage liquid is above the temperature of the hot water, quick response apparatus comprising means for extracting heat from the standpipes and radiating the heat to the building.

5. Heating apparatus as defined in claim 4 and further comprising a temperature switch for detecting the temperature of the storage liquid and for deactivating the boiler when the temperature reaches a certain level.

6. Heating apparatus as defined in claim 4 and wherein the collector means comprises a fireplace grid mounted in the hearth of a fireplace and adapted to contain the working fluid and transfer heat from the fireplace to the working fluid.

7. Heating apparatus for use in combination with a heating system for a building including a heat source for heating a medium and means for circulating the medium through a supply conduit to other parts of the building for heating the building, said heating apparatus comprising:
    a working fluid;

collector means for collecting heat from a second surface for heating the working fluid;

a heat storage tank for containing a heat storage liquid located at a level lower than the collector means;

a first standpipe in communication with the collector means for receiving heated working fluid from the collector means;

a second standpipe at least partially submerged in the heat storage liquid and in thermal conductive relationship with the first standpipe at its lower end for flow therebetween and in communication with the collector means at its upper end whereby the working fluid may circulate through the collector means and standpipes and heat the standpipes and the heat may be extracted into the heat storage liquid;

a first heat exchanger comprising a closed conduit loop routed through the storage liquid and the supply conduit adapted to contain a heat transfer fluid and thermally circulate the heat transfer fluid from the heat storage liquid to the supply conduit for picking up heat from the heat storage liquid and for transferring the heat to the medium for heating the building; and a second heat exchanger comprising a closed conduit loop routed around at least one of the standpipes and coupled to a radiator and adapted to thermally circulate a second heat transfer picking up heat from the standpipes and transferring the heat to the radiator for distribution to the building.

8. Heating apparatus as defined in claim 7 and wherein the working fluid is water.

9. Heating apparatus as defined in claim 8 and wherein the first and second heat transfer fluids are water.

10. Heating apparatus for heating a building comprising;

a working fluid;

first and second standpipes adapted to contain the working fluid and extending from an elevated location to a lower location, the two standpipes connected for flow therebetween near their lower ends thereof and in thermal conductive relationship at least over a substantial portion thereof;

means for heating the working fluid in one of the standpipes near the elevated location;

an expansion chamber for collecting heated working fluid expelled from the standpipe to which heat is added and for discharging the collected working fluid to the other standpipe;

a heat storage tank for containing a heat storage liquid with a portion of at least one of the standpipes submerged in the heat storage liquid near the lower level whereby heated working fluid may circulate through the standpipes and the heat added to the working fluid near the elevated location extracted at the lower level into the heat storage liquid; and a first heat exchanger comprising a closed conduit loop adapted to contain a first heat transfer fluid and routed through the heat storage liquid and coupled to heat radiators for thermally circulating the heat transfer fluid from the storage tank to the radiators whereby heat may be extracted from the heat storage liquid and distributed to the building, a second heat exchanger comprising a closed conduit loop coupled to a heat radiator and routed from the radiator around a portion of at least one of the standpipes adapted to contain a second heat transfer fluid and thermally circulate the second heat transfer fluid for picking up heat from the standpipes and for radiating the heat through the radiators to the building.

* * * * *